US008515629B2

(12) United States Patent
Medwin et al.

(10) Patent No.: US 8,515,629 B2
(45) Date of Patent: Aug. 20, 2013

(54) SYSTEM FOR MANAGING OPERATION OF AN INDUSTRIAL VEHICLE IN RESTRICTED AREAS

(75) Inventors: Steve Medwin, Binghamton, NY (US); Paul P. McCabe, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 4 days.

(21) Appl. No.: 13/487,645

(22) Filed: Jun. 4, 2012

(65) Prior Publication Data

US 2012/0245765 A1 Sep. 27, 2012

Related U.S. Application Data (62) Division of application No. 12/423,877, filed on Apr. 15, 2009.

(60) Provisional application No. 61/046,247, filed on Apr. 18, 2008.

(51) Int. Cl.
*G06F 7/70* (2006.01)

(52) U.S. Cl.
USPC .................................................. 701/50; 701/2

(58) Field of Classification Search
USPC ............................................................ 701/50
See application file for complete search history.

(56) References Cited

U.S. PATENT DOCUMENTS

| 4,849,735 A | 7/1989 | Kirtley et al. |
| 5,400,018 A | 3/1995 | Scholl et al. |
| 5,463,567 A | 10/1995 | Boen et al. |
| 5,491,670 A * | 2/1996 | Weber ........................... 367/127 |
| 5,579,227 A | 11/1996 | Simmons, Jr. et al. |
| 5,808,907 A | 9/1998 | Shetty et al. |
| 6,204,772 B1 | 3/2001 | DeMay et al. |

(Continued)

FOREIGN PATENT DOCUMENTS

| EP | 1655263 A1 | 5/2006 |
| GB | 2383310 A | 6/2003 |

(Continued)

OTHER PUBLICATIONS

Australian Patent Office Examination Report; Patent Application 2010246562; dated Nov. 11, 2011.

(Continued)

*Primary Examiner* — Thomas B Will
*Assistant Examiner* — Joel Mitchell
(74) *Attorney, Agent, or Firm* — Quarles & Brady LLP; George E. Haas (57) ABSTRACT

Operation of an industrial vehicle is controlled based on the location of that vehicle at a facility. The control method includes storing, in a memory device onboard the industrial vehicle, a definition of a first area in a facility. Radio signals are transmitted to the industrial vehicle from at least three transmitters, and for each radio signal, determining a propagation time from the transmitter to the industrial vehicle. A location of the industrial vehicle is derived from the propagation times of the radio signals, and the location is employed to determine when the industrial vehicle is within the first area. Operation of the industrial vehicle is altered in response to the industrial vehicle being within the first area. For example, the industrial vehicle may be disabled, its maximum travel speed limited or an alert is sent to the operator, when the industrial vehicle is within the first area.

18 Claims, 7 Drawing Sheets

(56) References Cited

U.S. PATENT DOCUMENTS

| | | |
|---|---|---|
| 6,952,680 B1 | 10/2005 | Melby et al. |
| 6,996,464 B2 | 2/2006 | Sorrells |
| 7,062,446 B1 | 6/2006 | Suhy, Jr. et al. |
| 7,092,803 B2 | 8/2006 | Kapolka et al. |
| 7,152,035 B1 | 12/2006 | Suhy, Jr. |
| 7,165,040 B2 | 1/2007 | Ehrman et al. |
| 7,171,381 B2 | 1/2007 | Ehrman et al. |
| 7,356,494 B2 | 4/2008 | Ehrman et al. |
| 7,395,275 B1 | 7/2008 | Parent et al. |
| 7,656,271 B2 * | 2/2010 | Ehrman et al. ............ 340/5.8 |
| 7,944,368 B2 * | 5/2011 | Carter et al. ............ 340/686.6 |
| 2002/0077944 A1 | 6/2002 | Bly et al. |
| 2002/0082966 A1 | 6/2002 | O'Brien et al. |
| 2002/0087345 A1 | 7/2002 | Bly et al. |
| 2002/0116246 A1 | 8/2002 | Wippersteg |
| 2003/0028323 A1 | 2/2003 | Zeitler et al. |
| 2003/0216976 A1 | 11/2003 | Ehrman et al. |
| 2003/0225707 A1 | 12/2003 | Ehrman et al. |
| 2004/0225440 A1 | 11/2004 | Khatwa et al. |
| 2005/0086239 A1 | 4/2005 | Swann et al. |
| 2005/0108089 A1 | 5/2005 | Ehrman et al. |
| 2005/0131729 A1 | 6/2005 | Melby et al. |
| 2006/0061469 A1 | 3/2006 | Jaeger et al. |
| 2006/0208890 A1 | 9/2006 | Ehrman et al. |
| 2006/0208891 A1 | 9/2006 | Ehrman et al. |
| 2006/0208892 A1 | 9/2006 | Ehrman et al. |
| 2006/0229906 A1 | 10/2006 | Suhy, Jr. et al. |
| 2007/0007080 A1 | 1/2007 | Manthey et al. |
| 2007/0045019 A1 | 3/2007 | Carter et al. |
| 2007/0229251 A1 | 10/2007 | Ehrman et al. |
| 2007/0239292 A1 | 10/2007 | Ehrman et al. |
| 2007/0239324 A1 | 10/2007 | Ehrman et al. |
| 2007/0290840 A1 | 12/2007 | Ehrman et al. |
| 2008/0015955 A1 | 1/2008 | Ehrman et al. |
| 2008/0068170 A1 | 3/2008 | Ehrman et al. |
| 2008/0068171 A1 | 3/2008 | Ehrman et al. |
| 2008/0071429 A1 | 3/2008 | Kraimer et al. |
| 2008/0122626 A1 | 5/2008 | Ehrman et al. |
| 2008/0129445 A1 | 6/2008 | Kraimer et al. |
| 2008/0136584 A1 | 6/2008 | Ehrman et al. |
| 2008/0140440 A1 | 6/2008 | Ehrman et al. |
| 2008/0140482 A1 | 6/2008 | Ehrman et al. |
| 2008/0140483 A1 | 6/2008 | Ehrman et al. |
| 2008/0140544 A1 | 6/2008 | Ehrman et al. |
| 2008/0154691 A1 | 6/2008 | Wellman et al. |
| 2008/0154712 A1 | 6/2008 | Wellman |

FOREIGN PATENT DOCUMENTS

| | | |
|---|---|---|
| JP | 2001225926 | 8/2001 |
| JP | 2002060016 | 2/2002 |
| JP | 2003037903 | 2/2003 |
| JP | 2005043974 | 2/2005 |
| JP | 2005-255347 A | 9/2005 |
| WO | 9640533 A1 | 12/1996 |
| WO | 2009073674 A1 | 6/2009 |

OTHER PUBLICATIONS

Australian Patent Examination Report No. 2; Patent Application No. 2010246562; dated Sep. 20, 2012.

* cited by examiner

FIG. 11

SYSTEM FOR MANAGING OPERATION OF AN INDUSTRIAL VEHICLE IN RESTRICTED AREAS

CROSS-REFERENCE TO RELATED APPLICATIONS

This application is a division of U.S. patent application Ser. No. 12/423,877 filed on Apr. 15, 2009, and claims benefit of U.S. provisional patent application No. 61/046,247 filed on Apr. 18, 2008.

STATEMENT CONCERNING FEDERALLY SPONSORED RESEARCH OR DEVELOPMENT

Not applicable.

BACKGROUND OF THE INVENTION

1. Field of the Invention

The present invention relates to industrial vehicles, such as lift trucks; and more particularly to a system for sensing performance characteristics of an industrial vehicle and using those characteristics to manage the operation of the vehicle.

2. Description of the Related Art

Industrial vehicles of various types, including material handling vehicles, are used to move items inside a factory, a warehouse, a freight transfer station, a store, or other type of facility. In order to effectively and efficiently operate a warehouse, for example, it is important to ensure that the equipment and employees are as productive as possible. Recent studies, in fact, have indicated that 70 percent to 80 percent of the cost of owning and operating an industrial vehicle is attributed to labor. For a warehouse to compete on the global level, continually improving operator productivity is vital to reducing costs. To meet these goals, warehouse management systems are frequently employed to control inventory, ensure proper maintenance of equipment, and to monitor operator and equipment efficiency. In these warehouse management systems, a centralized computer system monitors inventory flow, use of the industrial vehicle, vehicle maintenance status, and operator performance.

To provide these functions, data is gathered from each industrial vehicle. In order to gather the data, wiring harnesses and sensors typically are added to the industrial vehicle after manufacture, often after delivery to the warehouse. These wiring harnesses connect sensors and other devices to a dedicated onboard computer, and provide a number of connection points within the vehicle. Because of the large number of connection points, these add-on systems are susceptible to failure. In addition, the post-manufacture sensors provide only limited information and can be inaccurate. Thus a more optimized system for monitoring a vehicle's performance and operation is desired.

Safe operation of an industrial vehicle requires, operator training and skill, good lift truck maintenance and a safe workplace with appropriately configured lift trucks. Fragile loads sometimes fall off and are damaged when the operator drives the industrial vehicle too fast for conditions in the warehouse. Also certain warehouse environments, such as cold storage areas and areas with potentially explosive atmospheres, require special industrial vehicles that are designed to operate in such environments. For example, Standard UL 583, promulgated by the Underwriters Laboratories of Northbrook, Ill., U.S.A., specifies "spark proof" characteristics for a Type EE industrial vehicle for use in areas where flammable materials are stored. A potential hazard exists when a vehicle that is not Type EE rated is used in such storage areas.

As industrial vehicles have gotten more sophisticated, with computerized controls for example, maintenance practices have had to change accordingly. A particular lift truck model may have numerous optional features that a user may choose to have added during manufacture. Typically a dealer dispatches a service technician to the warehouse or factory to perform maintenance and repairs on an industrial vehicle. The service technician needs to know exactly which application specific options and features have been incorporated into the vehicle being serviced and may need access to any of several service manuals associated with the particular vehicle model and the installed options and features. This means that in order to service a complete product line of industrial vehicles and different models which have been manufactured over many years, the service technician has to be able to access a sizable library of manuals and supplementary materials when in a warehouse or factory.

SUMMARY OF THE INVENTION

An industrial vehicle has a computerized controller that receives data from a plurality of sensors which monitor different operating parameters of the vehicle. The industrial vehicle has components that communicate wirelessly via a bidirectional warehouse communication system with a computer system at a facility, such as a warehouse or a factory, where the vehicle operates. This enables data regarding the operating parameters to be sent to the computer system and enables the industrial vehicle to receive data and commands from the computer system. Additionally, the warehouse communication system is connectable through a network, such as the Internet, to remote computers, such as at the headquarters of the company that operates the facility and at the manufacturer of the vehicle.

The controller on the industrial vehicle in communication with other computers enables implementation of various functions which control operation of the vehicle. One function limits vehicle operation to assist in protecting fragile loads from being damaged by a careless operator. The control system on the vehicle reads an indicator on a load being transported by the industrial vehicle and determines from that indicator whether the load requires delicate handling. If that is the case, operation of the industrial vehicle is limited to provide such delicate handling. For example, the speed and/or rate of acceleration of the vehicle may be limited to lower than normal levels.

In different embodiments, reading the indicator on a load employs either a radio frequency identification tag reader, a bar code reader, or a device that utilizes a communication protocol defined by IEEE standard 1902.1 promulgated by The Institute of Electrical and Electronics Engineers, Inc., New York, N.Y., U.S.A.

Another function accumulates data regarding operation of the industrial vehicle to transport loads and analyzes that data to evaluate the vehicle performance. Here, a sensor detects when a load is being transported, and the controller onboard the industrial vehicle counts each load, thereby compiling load data. Additional types of data, such as for example, the weight of each load and the time that each load is being transported, also may be detected and added to the load data.

The controller responds to a given event by wirelessly transmitting the load data via a communication system to a computer system. For example, the controller may tabulate the load data every hour or every work shift, at the conclusion of which, the load data is transmitted to the computer system at the facility in which the vehicle operates.

The computer system transforms the load data into performance data denoting operational efficiency of the industrial vehicle. For example, the load data from one industrial vehicle is compared to similar data from other industrial vehicles at the facility or at a plurality of facilities. Such caparisons provide an efficiency evaluation of the performance of one vehicle or one operator.

In another case, the location of an industrial vehicle at a facility is detected, such as by using the global positioning satellite system or signals from a wireless communication system. At least one restricted area is defined at the facility. The location information is employed to determine when the industrial vehicle is within the restricted area, in which event operation of that vehicle is limited. For example, vehicle operation is disabled upon entering the restricted area.

In another aspect of this method, an alert area also is defined at the facility, such as in front of an entrance to the restricted area. When the location of the industrial vehicle is determined to be within the alert area, a notification is issued, for example to remind the vehicle operator of the proper operating guidelines.

Another function involves operating the industrial vehicle to utilize battery power efficiently. The battery is recharged when necessary by electricity from a utility company, which charges a first rate for electricity delivered during a first period of a day and charges a higher second rate for electricity delivered during a second period of the day. Operation of the industrial vehicle during the second period is limited to prolong battery life. For example, the maximum speed of travel is limited to lesser than normal at that time. Thus when the battery is required to be recharged, that recharging likely will occur during the first period of a day when a lower electric rate is in effect.

Servicing the industrial vehicle is facilitated by a process in which vehicle repair information is stored in a database implemented by a computer system. Upon occurrence of an operating problem, the industrial vehicle generates a fault code designating the operating problem. The fault code is used to access the database and obtain the repair information associated with the operating problem.

In one embodiment, the repair information describes a process for diagnosing the cause of the operating problem and identifying components which require replacement. Thereafter, other repair information is accessed which describes a process for replacing the component of the industrial vehicle which caused the operating problem.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENT

The present invention relates to the operation of an industrial vehicle. Although the invention is being described in the context of a stand-up counterbalanced lift truck used at a warehouse, the inventive concepts are applicable to other types of industrial vehicles, and specifically material handling vehicles, and their use in a variety of facilities, such as a factories, a warehouses, freight transfer stations, and stores, for example.

Figure 1:
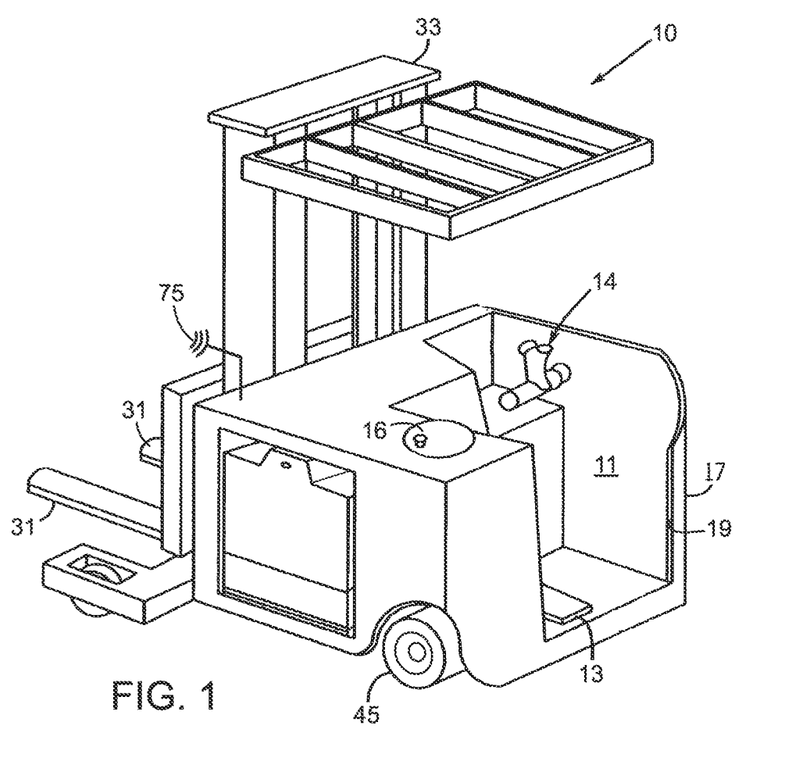
FIG. 1 is a perspective view of an industrial vehicle including a system that provides wireless communications between a vehicle controller and a warehouse computer system in accordance with the present invention.

With initial reference to FIG. 1, an industrial vehicle 10, specifically a lift truck, includes an operator compartment 11 with an opening 19 for entry and exit by the operator. Associated with the operator compartment 11 are a control handle 14, a floor switch 13, and steering wheel 16. An antenna 75 for wireless communications with an external warehousing system is coupled to the industrial vehicle 10 and is, as described more fully below, connected to an internal vehicle controller 12 (FIG. 2) to provide bidirectional communications with a warehousing system. Although the industrial vehicle 10 which is shown by way of example as a standing, fore-aft stance operator configuration reach truck, it will be apparent to those of skill in the art that the present invention is not limited to vehicles of this type, and can also be provided in other types of industrial vehicle configurations including, without limitation, material handling vehicles, pallet trucks, lift trucks, orderpickers, sideloaders, stacker/retrieval machines, reach trucks, swing reach trucks, tow tractor, counterbalanced fork lift vehicles, and other industrial trucks. Furthermore, even though the present inventive concepts are being described in the context of a battery powered vehicle, they apply equally well to vehicles with internal combustion engines.

Figure 2:
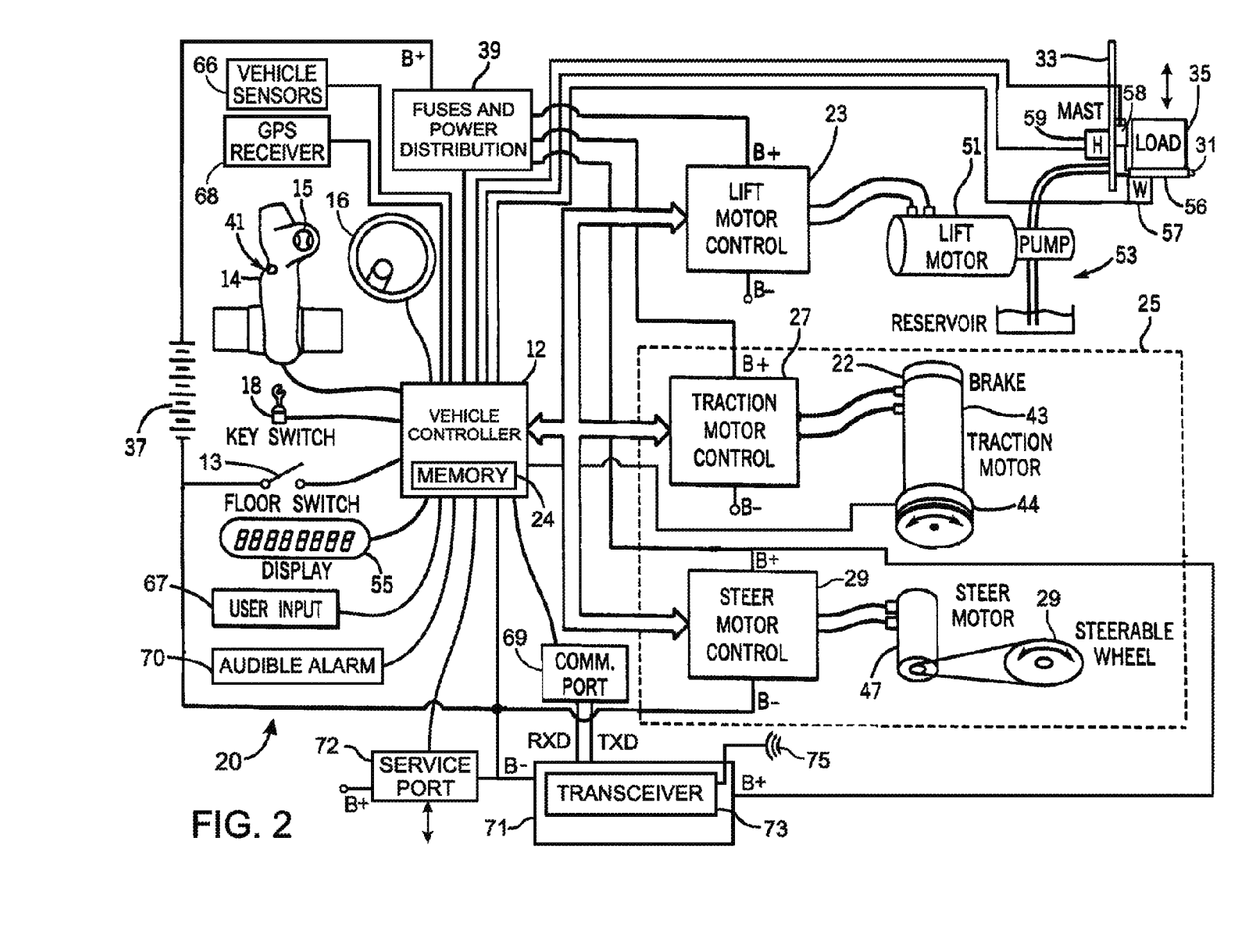
FIG. 2 is a block diagram of a control system of the industrial vehicle.

Referring now to FIG. 2, a block diagram of a control system 20 for a typical industrial vehicle 10 in which the present invention can be provided is illustrated. The control system 20 comprises a vehicle controller 12 which is a microcomputer based device that includes memory 24 and input/ output circuits. The input/output circuits receive operator input signals from the operator control handle 14, the steering wheel 16, a key switch 18, and the floor switch 13; and provide command signals to each of a lift motor control 23 and a drive system 25 including both a traction motor control 27 and a steer motor control 29. The drive system 25 provides a motive force for driving the industrial vehicle 10 in a selected direction, while the lift motor control 23 drives load carrying forks 31 along a mast 33 to raise or lower a load 35, as described below. The industrial vehicle 10 and vehicle controller 12 are powered by one or more batteries 37 that are electrically coupled to the vehicle controller, drive system 25, steer motor control 29, and lift motor control 23 through a bank of fuses or circuit breakers 39.

As noted above, the operator inputs include a key switch 18, floor switch 13, steering wheel 16, and an operator control handle 14. The key switch 18 is activated to apply power to the vehicle controller 12, thereby enabling the industrial vehicle 10. The floor switch 13 provides a signal to the vehicle controller 12 for operating the brake 22 to implement a deadman braking function that disables motion of the vehicle unless the floor switch is activated by the operator.

Rotation of the operator control handle 14 in a vertical plane provides a travel request signal to the vehicle controller 12 that indicates a travel direction and speed for the industrial vehicle 10. A four-way switch 15 located on the top of the handle 14 provides a tilt up/down function when activated in the forward and back directions and a side shift right and left function when activated to the right and left directions. A plurality of control actuators 41 located on the handle 14 direct a number of additional functions, and can include, for example, a reach pushbutton, a retract pushbutton, and a horn pushbutton as well as a potentiometer providing a lift function. A number of other vehicle functions also can be provided depending on the construction and intended use of the industrial vehicle 10.

The traction motor control 27 drives one or more traction motors 43 which is connected to a propulsion wheel 45 to provide motive force to the industrial vehicle. The speed and direction of the traction motor 43 and the associated propulsion wheel are designated by the operator via the operator control handle 14, and are monitored and controlled through feedback derived from a rotation sensor 44. The rotation sensor 44 can be an encoder or motion sensor coupled to the traction motor 43 and the signal therefrom is used to measure the distance that the vehicle travels. The rotation sensor signal is used to increment a software implemented odometer on the vehicle. The propulsion wheel 45 is also connected to friction brake 22 through the traction motor 43, to provide both a service and parking brake function for the industrial vehicle 10. The friction brake 22 can be spring-activated so that it defaults to a "brake-on" state, such that the floor switch 13 and associated brake 22 therefore provide the deadman braking function. The operator must provide a signal indicating that the deadman brake is to be released to drive the industrial vehicle, here provided by the floor switch 13, as described above. The traction motor 43 is typically an electric motor, and the associated friction brakes 22 can be either electrically operated or hydraulically operated devices. Although one friction brake 22, traction motor 43, and propulsion wheel 45 are shown, the industrial vehicle 10 typically includes a plurality of these elements.

The steer motor control 29 is connected to drive a steer motor 47 and associated steerable wheel 49 in a direction selected by the operator by rotating the steering wheel 16, described above. The direction of rotation of the steerable wheel 49 determines the direction that the industrial vehicle 10 travels.

The lift motor control 23 sends command signals to control a lift motor 51 which is connected to a hydraulic circuit 53 that form a lift assembly for raising and lowering the forks 31 along the mast 33, depending on the direction selected at the control handle 14. In some applications, the mast 33 can be a telescoping mast, in which case the hydraulic circuit also raises and lowers the mast. As shown here, a height sensor 59 is provided in the mast control system to provide a signal to the vehicle controller 12 indicating the height of the mast 33. The height sensor 59 can be, for example, an encoder, a flow sensor in the hydraulic system, a light beam, or other types of sensors. Similarly, a weight sensor 57 is provided on the forks 31. The weight sensor 57 can be, for example, a load cell, strain gauge, light beam or pressure sensor in the lift system and provides a signal to the vehicle controller 12 that indicates whether a load is on the forks, and a weight of the load. A load sensor 58 is mounted on the mast to obtain an identification of the goods being transported. The load sensor 58, may be, for example, a radio frequency identification (RFID) tag reader, a Rubee™ device that complies with IEEE standard 1902.1, a bar code reader, or other device capable of reading corresponding identifiers on the goods or the pallet that holds the goods In addition to providing control signals to the drive and lift control systems, the vehicle controller 12 furnishes data to a display 55 that presents information to the vehicle operator. That information can include, for example, a number of pallets moved, a number of pallets moved during a period of time (e.g. per hour or per work shift), an average number of pallets moved by the vehicle per day, the weight of each pallet or load, and identification of the goods being transported. In addition, the display indicates vehicle operating parameters, such as for example, the speed of travel, battery charge level, hours of operation, time of day, and maintenance needed to be performed. Although not shown here, temperature sensors can also be included to monitor the temperature of the motors and other components. As used herein the terms "speed of travel" and "travel speed" refer to the rate at which the industrial vehicle 10 moves across the floor of the warehouse. Furthermore, the functions stated hereinafter of restricting or limiting the speed of travel refers to reducing that speed from the level that otherwise could be attained by the industrial vehicle. In other words, the operator would be able to drive the industrial vehicle at a greater speed, if such restricting or limiting did not occur and is not warranted.

Referring still to FIG. 2, a number of data input and output devices can also be connected to the vehicle controller 12, including, for example, vehicle sensors 66 for parameters such as temperature and battery charge level, a user input device 67, a GPS receiver 68, a communication port 69, and a maintenance service port 72. The user input device 67 allows the operator, a supervisor, or other personnel to enter data into the vehicle controller 12, and can be implemented as a touch screen in display 55, a keyboard, a series of discrete pushbuttons, a mouse, joystick or other input device as will be apparent to those of ordinary skill in the art.

The communication port 69 is connected to a wireless communication device 71 that has an antenna 75 for exchanging data with a communication system in the warehouse or factory in which the industrial vehicle 10 operates. The wireless communication device 71 includes a transceiver 73 for transmitting messages to and receiving messages from the warehouse communication system. Preferably the transceiver employs radio frequencies, although other optical, ultrasonic and other forms of wireless communication can be used. Any one of several communication protocols such as Wi-Fi can be used to exchange messages and data via that communication link. Each industrial vehicle 10 has a unique identifier that enables messages to be specifically communicated to that vehicle. The unique identifier may be the serial number of the industrial vehicle or a unique address on the warehouse communication system. The unique identifier usually is included in every message sent to and from the industrial vehicle 10, however some messages are broadcast to all the industrial vehicles in the warehouse by using a broadcast identifier to which all vehicles respond.

Figure 3:
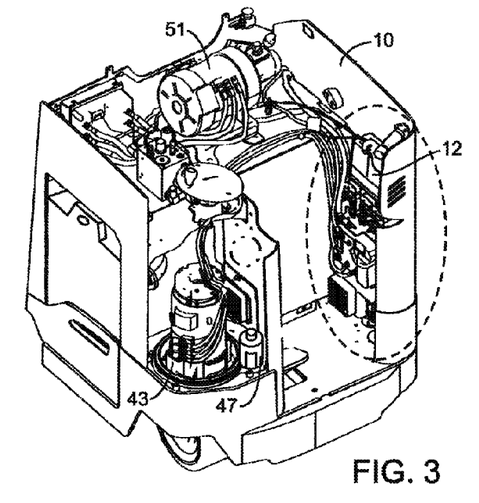
FIG. 3 is a back view of the industrial vehicle with a housing removed to illustrate connection of wireless communication transceiver to the industrial vehicle.
Figure 4:
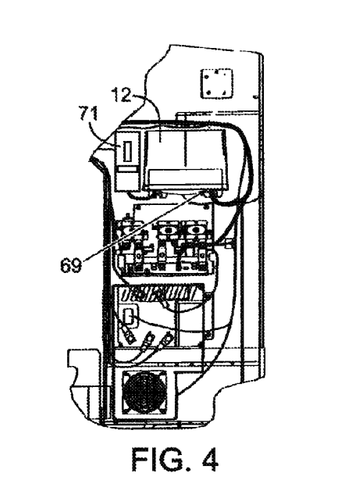
FIG. 4 is an enlarged section of FIG. 3, that is indicated by a dashed oval, illustrating connections to a terminal strip for coupling the wireless communication transceiver to a wiring harness in the industrial vehicle.
Figure 5:
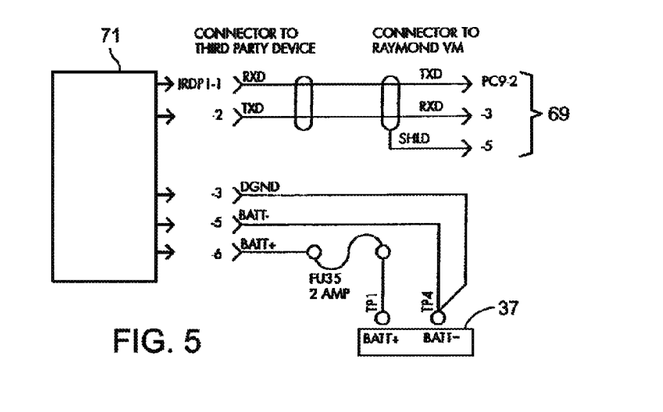
FIG. 5 is a circuit diagram of the wiring harness.

Referring now to FIGS. 3-5, the communication port 69 is provided in the wiring harness of the industrial vehicle 10 adjacent a housing for the vehicle controller 12. The wireless communication device 71 includes a mating connector that can be connected directly to the communication port 69. As shown here, additional connections are made to a terminal strip to provide power connections to the battery 37. However, it will be apparent that battery power could also be routed directly through additional terminals of the communication port 69. This connection allows the transmission of sensor data, operational state data, and switch and control state data from the vehicle controller 12 to external equipment. Additionally, because of the direct connection to the vehicle controller 12, the wireless communication device 71 can receive commands from external equipment and to provide those commands to the vehicle controller. Such commands may limit the speed or acceleration of the vehicle, provide data on a display, and disable vehicle operation, as well as control other functions of the vehicle, as described more fully below.

Referring again to FIG. 2, the vehicle controller 12 stores data regarding the operation of the industrial vehicle 10. That data can include number of hours in operation, battery state of charge, and fault codes encountered. The hours of operation is calculated as a function of the time that the key switch 18 is closed, that the vehicle controller 12 floor switch 13 is depressed, that the lift motor 51 is active, or that the industrial vehicle 10 is traveling based on feedback from rotation sensor 44 connected to the traction motor 43. In addition, operation of the lift can be monitored using the time that the lift motor 51 is active. Various speed parameters such as speed and acceleration of the vehicle and of the mast 33 can also be monitored. The vehicle operational data is collected and stored in a memory or other storage device within the vehicle controller 12.

The vehicle operational data also can include an operator identifier, such as a name or employee number, which is entered through a user input device 67 into to the vehicle controller 12. Additionally, operator checklists, including those mandated by the U.S. Occupational Safety and Health Administration (OSHA), can be presented to the operator via the display 55. Data acquired from these checklists can be associated with the operator along with data related to that person's driving parameters. For example, average vehicle acceleration rates and speeds may be monitored, as well as collision data, number of pallets moved, or other data useful in monitoring operator performance and efficiency. The operator employs the user input device 67 to enter responses to the checklist items.

Figure 6:
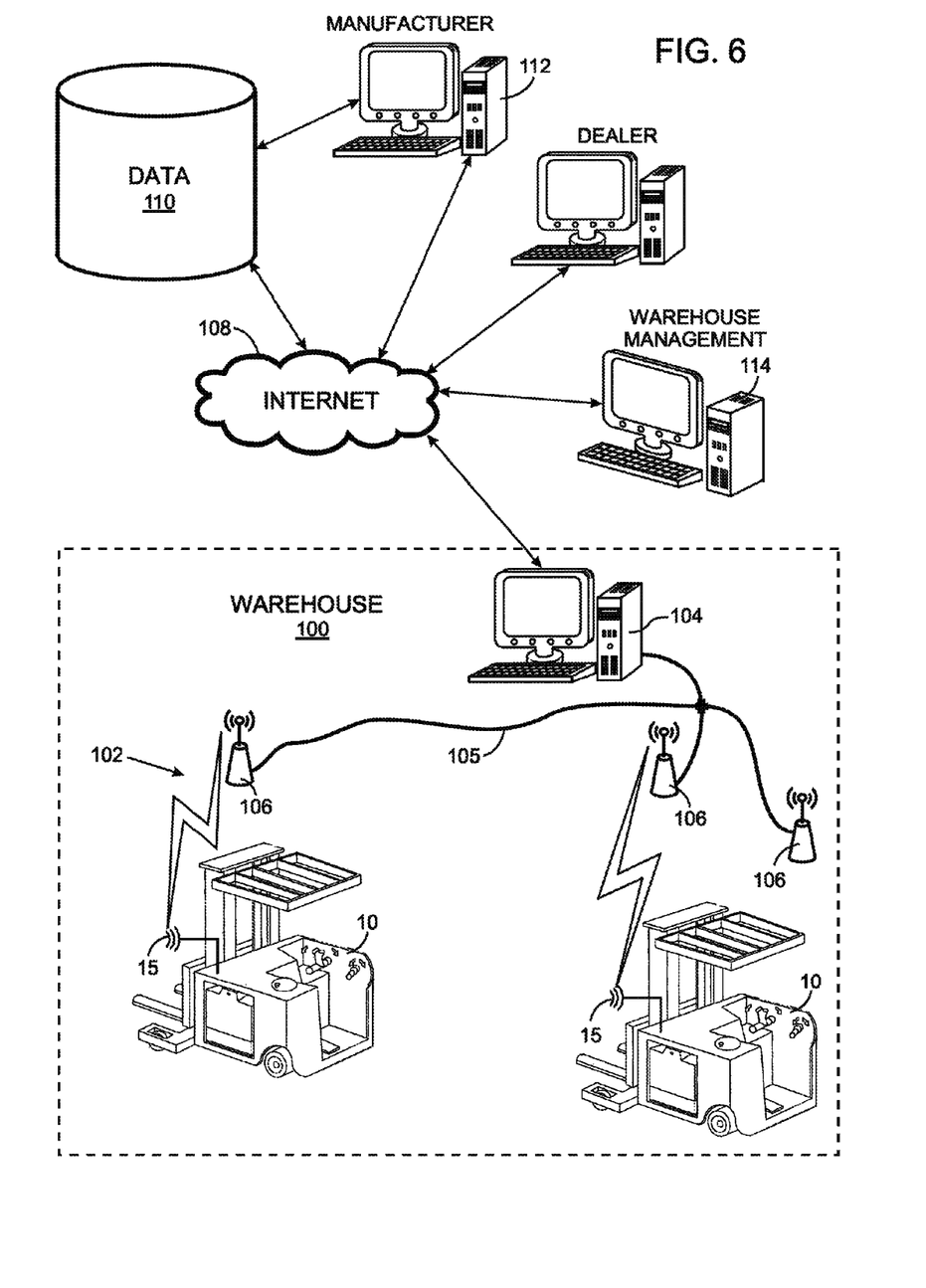
FIG. 6 depicts an exemplary vehicle fleet management system in which industrial vehicles in a warehouse communicate via a network with a central computer in the warehouse that is linked to a remote database to which other computers have access.

Referring now to FIG. 6, a warehouse 100, in which one or more industrial vehicles 10 operates, includes a communication system 102 that links the vehicles to a centralized warehouse computer system 104. The communication system 102 includes a plurality of wireless access points 106 distributed through a warehouse 100, such as in a shipping dock and goods storage areas. The wireless access points 106 are wireless transceivers that are connection via a conventional local area network 105 or a TCP/IP communications link to the centralized warehouse computer system 104. Alternatively the wireless access points 106 can be wirelessly coupled, such as through a Wi-Fi link, to the warehouse computer system 104.

Figure 7:
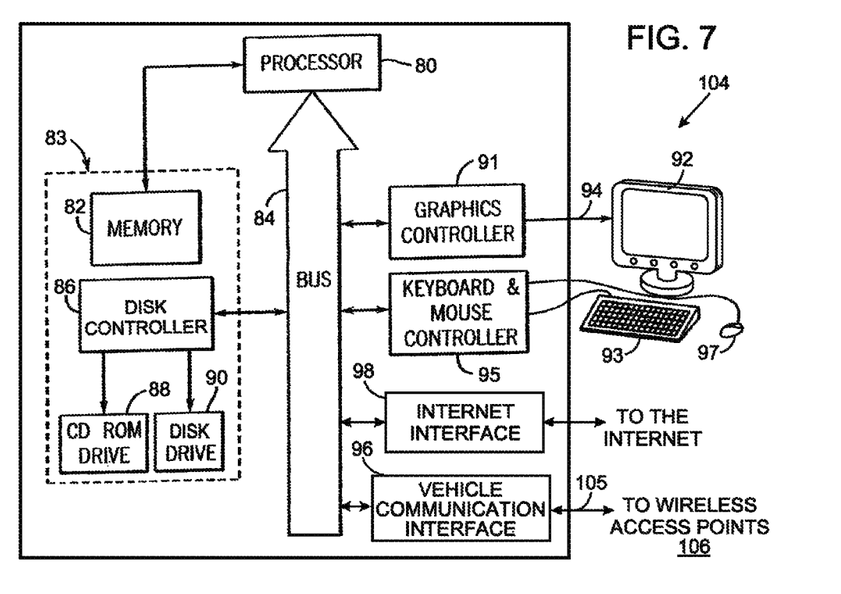
FIG. 7 is a block diagram of the centralized computer in the warehouse.

With reference to FIG. 7, the warehouse computer system 104 includes a processor 80 which executes program instructions stored in a memory 82 that forms part of a storage system 83. The processor 80 is a commercially available device designed to operate with a Microsoft Windows® operating system, for example. It includes internal memory and I/O control to facilitate system integration and integral memory management circuitry for handling all external memory 82. The processor 80 also includes a bus driver which provides a direct interface with a multi-bit bus 84.

The bus 84 is an industry standard bus that transfers data between the processor 80 and a number of peripheral devices. Those devices include a disc controller 86 which provides a high-speed transfer of data to and from a CD ROM drive 88 and a hard disk drive 90. A graphics controller 91 couples the bus 84 to a standard monitor 92 through a standard VGA connection 94, and a keyboard and mouse controller 95 receives data that is manually input through a keyboard 93 and mouse 97. The bus 84 also connects to a vehicle communication interface 96 that connects to the wireless access points 106, and an internet interface 98 is provided to link the warehouse computer system 104 to the Internet.

Returning to FIG. 6, the management computer system 114 at the headquarters of the warehouse company is similar to that described for the warehouse computer system 104 in so far as the present invention is concerned, except that it is not connected via the local area network 105 to the wireless access points 106. Thus both warehouse computer system 104 and the warehouse management computer system 114 execute the same software for storing, analyzing and reporting the operating information for the industrial vehicles.

The connection of the warehouse computer system 104 to the Internet 108, or other external communication network, couples the warehouse computer system to a database 110 that stores vehicle specific data provided by the manufacturer from a manufacturer computer 112. Selected data can also be accessed by, for example, warehouse management personnel or vehicle dealers, who can connect to the database 110 through the Internet 108 by way of an extranet or similar system.

Data stored in the database 110 can be accessed with reference to the serial number of a specific vehicle or a model number and includes, for example, the following:
Vehicle documentation and parts & service manuals,
Field service bulletins and other information,
Options added (vehicle modification history),
As built Bill of Materials,
As built vehicle performance information,
Service and replacement parts history,
Operating history (impacts, hour meters, fault codes, age),
Use history (hour meters, fault codes, battery state-of-charge),
Sale/resale history, and
Projected end of service date.

Data in the database 110 can be associated with the serial number of a specific vehicle. This serial number can be used to access detailed information about a particular vehicle. Additionally, based on the serial number, the appropriate vehicle documentation, parts and service manuals, and field service bulletins or other information can be accessed.

Referring still to FIG. 6, during typical operation, each industrial vehicle 10 in a warehouse transmits messages containing operational data and its serial number through antenna 75 and communication system 102 to the warehouse computer system 104, which stores the information. The data can be transmitted continuously while the vehicle is operating, at defined time periods, or at the end of a shift. Information gathered from each vehicle 10, then is relayed occasionally through the Internet 108 to the database 110 and also may be sent to the warehouse management computer system 114 at the headquarters of the warehouse company.

Because of the bidirectional communications between the vehicle controller 12 and the warehouse communication system 102, the warehouse computer system 104 can also control vehicle operational parameters. In particular, the system can control the maximum travel speed and acceleration of the industrial vehicle in both the forward and reverse travel directions. Additionally, the mast velocity and acceleration can also be controlled, in both up and down directions. Other vehicle functions, such as the horn, can also be activated by the warehouse computer system 104, as an alarm when certain operating conditions are detected.

Thus, for example, the warehouse control system can correlate the work intensity of a vehicle to the level of wear experienced by key components. For example, if a temperature sensor indicates that the component temperatures are rising at a higher than expected rate, but the overall level of productivity is not excessive, it could be concluded that an operator is using the industrial vehicle very hard for a period and then sitting idle. To prevent overheating of the vehicle, the warehouse communication system can limit both the acceleration and maximum speed of the industrial vehicle. The vehicle operation parameters, such as speed and acceleration, can also be limited to control energy consumption of the vehicle, and to promote "green" vehicle usage.

The data accumulated by the vehicle controller 12 and stored within its memory 24 can be used for a variety of purposes in controlling the operation of the industrial vehicle 10. One function is to limit the speed and acceleration of the vehicle when a fragile load is being transported. This is accomplished by detecting the characteristics of the load each time that the forks 31 are raised or lowered along the mast 33 as depicted in FIG. 2. When the vehicle controller 12 sends a motion command to the lift motor control 23, the controller also commences executing a software load control routine 120 represented by the flowchart in FIG. 8. That routine commences at step 122 where the vehicle controller inspects the signal from the weight sensor 57 on the fork lift system. If that signal indicates that the forks 31 are not transporting a load, the routine immediately branches to step 132 at which normal operation of the vehicle is restored before the routine ends. Such restoration of normal operation occurs when a previously carried load is removed from the forks and the weight sensor 57 indicates no load.

Figure 8:
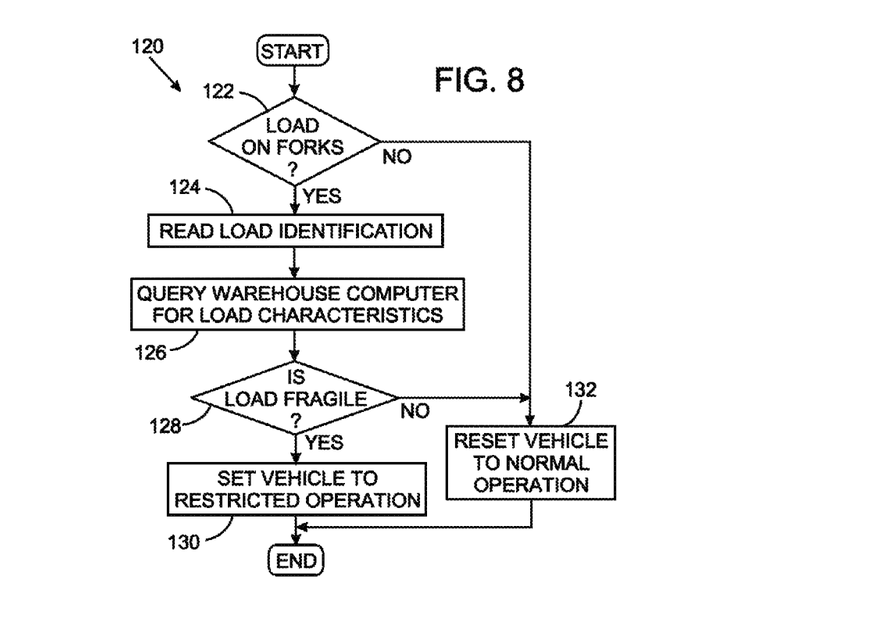
FIG. 8 is a flowchart of a software routine that is executed by the control system of the industrial vehicle to manage operation while transporting fragile loads.

Alternatively, when the weight sensor 57 indicates that the forks are now carrying a load at step 122, the routine advances to step 124 where the vehicle controller 12 reads the signal from the load sensor 58 that is mounted on the mast 33 or the forks 31 so as to read an indicator that is either on the load 35 or the pallet 56 on which the load is held. As noted previously, the load sensor 58 may be any one of a number conventionally known devices for obtaining information from an object. Examples of such sensors include a radio frequency identification tag reader, a Rubee™ device that complies with IEEE standard 1902.1, or a barcode reader. These devices read indicator from the load or pallet which identifies the load being carried. For example, each pallet 56 may have a unique identifier thus distinguishing that pallet from the other pallets in the warehouse. Regardless of whether the indicator is on the load 35 or the pallet 56 the signal from the load sensor 58 is referred to as "the load identifier".

Then at step 126, the vehicle controller sends an inquiry message via the communication port 69 and the wireless communication device 71 in FIG. 2 to the warehouse communication system 102 in FIG. 6. That inquiry message contains the unique identification number assigned to that industrial vehicle 10, which is used as the vehicle's address in the warehouse communication system 102. The inquiry message also contains the load identifier which has just been read and a notation that the message is requesting information about that load. The inquiry message is transmitted from the industrial vehicle 10 to the warehouse communication system access point 106 which is nearest to the industrial vehicle. Upon receipt, the access point 106 forwards that message via the local area network 105 to the centralized warehouse computer system 104. When forwarding the inquiry message, the particular access point 106 includes its local area network address.

The warehouse computer system 104 recognizes that incoming message as a load query from an industrial vehicle and responds by extracting the load identifier from that message. The load identifier is then utilized to access a database which contains characteristics of the materials that are on each pallet within the warehouse 100. Specifically, that database information is indexed by the load identifier enabling the warehouse computer system 104 to obtain information about the characteristics of a particular load. Among those characteristics is an indication of whether the load is fragile and thus requires delicate handling. That fragility indication is conveyed by the warehouse computer system 104 in a reply message that is addressed to the industrial vehicle 10 that sent the query. In particular, the industrial vehicle identification number that was carried by the inquiry message is copied into the reply message as the address of the intended vehicle recipient. The local area network address of the particular access point 106 that processed the inquiry message also is included. The formulated reply message is then transmitted by the warehouse computer system 104 via the local area network 105 to the designated access point 106, which then transmits the reply message wirelessly to the specified industrial vehicle. Alternatively, the reply message can be sent to all the access points 106, so that the reply is broadcast throughout the entire warehouse 100 in case the industrial vehicle 10 has moved out of range of the original access point 106.

Referring again to FIG. 8 along with FIG. 2, upon receiving the reply message from the warehouse computer system 104, the load control routine 120 executed by the vehicle controller 12 advances to step 128, where the message contents are read to determine whether a fragile load is indicated. If so, the program execution advances to step 130 where the vehicle is set to restricted operation to provide delicate handling of the load. That type of handling can be indicated by setting a fragility flag in the memory of 24 of the vehicle controller 12, which is read every time the operator desires to operate the traction motor 43 or the lift motor 51. A set fragility flag causes the vehicle controller 12 to limit the commands sent to the traction motor control 27 and the lift motor control 23. Thus regardless of the desired motion indicated by the operator's manipulation of the control actuators 41, the vehicle controller 12 limits the travel speed and rate of acceleration of the traction motor 43 and thus those parameters of the industrial vehicle 10. The speed at which the load is raised and lowered also is limited by restricting operation of the lift motor 51. As a consequence, when a fragile or delicate load is being carried, the industrial vehicle is operated in a manner that is less likely to disturb or damage the load.

If, however, the reply message indicates that the load is not fragile, the load control routine 120 branches from step 128 to step 132 at which the fragility flag within the vehicle controller memory 24 is reset to enable full, normal vehicle operation. This removes any restrictions on the speed or acceleration and thus the vehicle can operate at the maximum levels of those parameters.

Although it is generally desirable to assign a unique identifier to each pallet of materials within the warehouse so that the particular contents of the load can be identified for other purposes, the indicator on the load 35 or pallet 36 may simply designate whether or not the load is fragile. In other words, the indicator is not unique to a particular load, but one form of the indicator is used on all fragile load and another form is used on all non-fragile loads. In this case, the vehicle controller 12 does not have to interrogate the central warehouse computer system 104 for the fragility information, but can determine onboard whether the load is fragile and thus operate the traction motor accordingly. In this latter case, each industrial vehicle is controlled autonomously.

In either situation, when the industrial vehicle 10 deposits the load at the end of its transportation and the forks 31 are empty, that condition is detected at step 122 as there being no load on the forks. As noted previously in this condition, a branch occurs to step 132 where the vehicle is reset to normal operation until another fragile load is detected.

Figure 9:
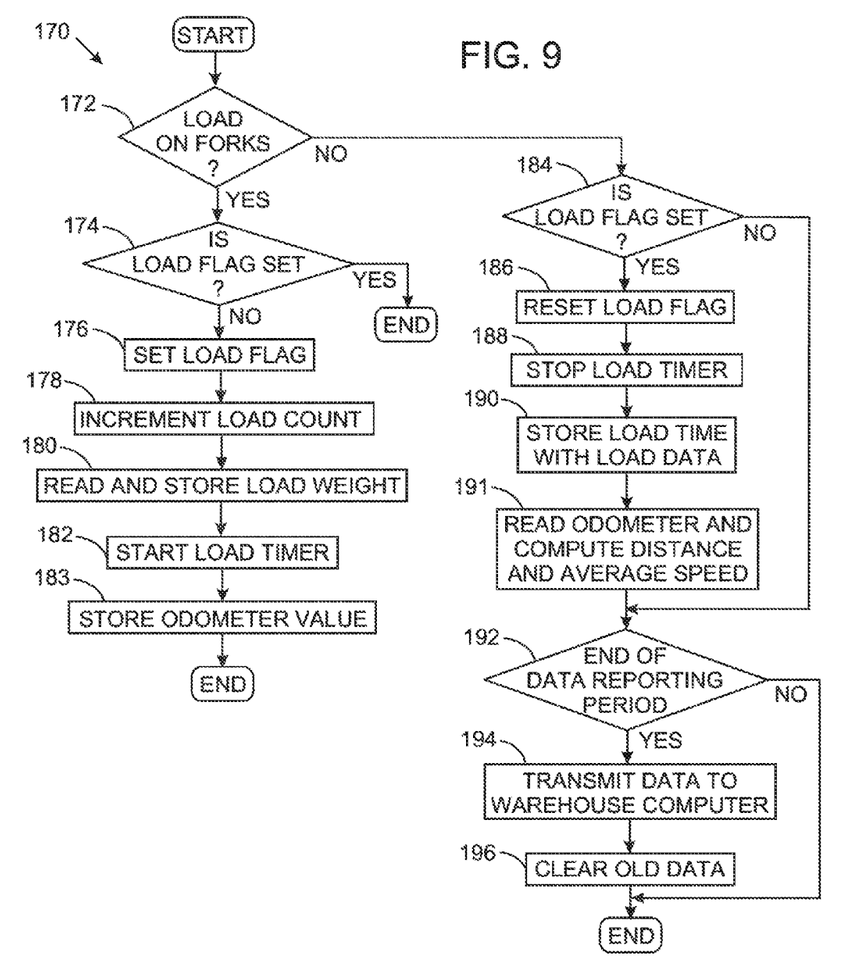
FIG. 9 is a flowchart of a software routine that enables the industrial vehicle to accumulate data about the loads that are transported.

Referring to FIGS. 2 and 9, the load weight sensor 57 can also be utilized to implement another function that tracks the performance and efficiency of the industrial vehicle 10. This function is performed by a load performance routine 170 executed by the vehicle controller 12 each time that the lift motor 51 is operated at which time the signal from weight sensor 57 is examined at step 172 to determine whether a new load has just been picked up. Alternatively the load sensor 58 may be used to determine the presence of a load 35 on the forks 31, however, unless a weight sensor 57 also is included on the vehicle, this technique does not permit monitoring the weight of each load. With either approach, a load flag in the memory 24 denotes whether a load is present on the forks 31. Therefore, if the weight sensor signal indicates a load on the forks, the routine advances to step 174 at which the load flag is examined. If the load flag already has been set, as occurs when a load was picked up previously, the routine ends until the lift motor 51 is operated again.

Alternatively, finding the load flag not set at step 174 denotes that a new load was just picked up. Now the routine branches to step 176 at which the load flag is set. Then at step 178, a count of the loads stored in memory 24 is incremented. Next the weight of the new load is determined at step 180 using the signal from the weight sensor 57 and the resultant value is stored in a load data table maintained in the memory 24. The length that each load is transported by the industrial vehicle 10 also is measured by starting a load timer at step 182, and a measurement of the travel distance commences by storing the present odometer value at step 183. Thereafter the load performance routine 170 terminates until the lift motor 51 is operated again.

If upon commencing execution of the load performance routine at step 172, a load is not found on the forks 31, a branch occurs to step 184 where the load flag is examined. If the load flag is set, then a load was just removed from the forks. This determination causes step 186 to be executed which resets the load flag to denote empty forks. Then at step 188, the load timer is stopped and at step 190 the load transport time is stored in the memory 24 with the other data for that load. Next at step 191, the odometer is read and the travel distance and average speed for that distance are computed and stored as part of the load data, before advancing to 192. Otherwise if at step 184 the load flag was found to denote empty forks, the load performance routine jumps directly to step 192 without storing any load data. The load data thus includes a load count, load weights, transport time, travel distance and average speed and may include other types of data, such as power consumption and idle time, pertaining to operation of the industrial vehicle.

The load data accumulated in this manner are tabulated during a predefined period, such as an hour, a work shift, or a day. The end of that predefined period can be determined at step 192 by the vehicle controller 12 reading a real time clock, which event causes the control system 20 to wirelessly transmit the load data via the warehouse communication system 102 to the warehouse computer system 104 at step 194. Instead of using a real time clock, the transmission of the load data may occur in response to a command received from the warehouse computer system 104, which sequentially sends such commands to all the industrial vehicles in the warehouse. After the transmission of the load data, the controller's memory 24 is cleared at step 196 for another data acquisition period.

The central warehouse computer system 104 receives similar load data from all the other industrial vehicles 10 within the warehouse 100. In the present example, the central warehouse computer system 104 in FIG. 6 analyzes load data to determine the performance and efficiency of each vehicle. The analysis of the performance and efficiency of a vehicle may employ benchmark data from the manufacturer and data gathered from vehicle operation at the warehouse.

Manufacturers of industrial vehicles typically conduct productivity tests that characterize the performance of a particular vehicle model. For example, a standardized test may be defined as a picking up a standard weight load at a specified height, transporting the load over a predefined path of a known distance, depositing the load at a given height, and traveling back to the starting point. During this action sequence, the vehicle operating parameters are sensed and stored. The action sequence is repeated several times to measure the number of such cycles that the vehicle is capable of performing per hour and produce average values for the vehicle operating parameters. This provides productivity benchmark data for that vehicle model.

The operational data from each industrial vehicle in the warehouse is compared to the productivity benchmark data to determine whether every vehicle is operating according to the manufacturer's specifications. Each vehicle's operational data also is compared to similar data produced by the other warehouse vehicles during the same time period to detect if one or more of them is operating significantly less efficiently than the others. Significant deviation from the benchmark data or the performance of the other vehicles of the same type at the warehouse indicates either a mechanical problem or an inefficient operator. Such deviations are reported to supervisory personnel at the warehouse to assist them in executing their duty to supervise operators and otherwise manage warehouse operations.

Recently gathered operational data also is compared to similar data gathered over past work periods at the warehouse from the same industrial vehicle and other vehicles of the same type or model. Significant changes in the current data from that gathered in the past also are reported to warehouse supervisory personnel.

The data can also be utilized to determine the amount of time between loads for each industrial vehicle and thus how much the entire fleet of industrial vehicles is being utilized. The total utilization of the fleet of industrial vehicles can be reviewed to determine whether additional vehicles should be obtained for use in the warehouse or on the other hand whether there are too many vehicles and thus the fleet can be reduced and still provide efficient warehouse operation.

The vehicle data comparison and analysis can occur at the warehouse computer system 104 in FIG. 6 and be limited to data from the vehicle fleet at that one facility, can occur at the warehouse management computer system 114 and use data from vehicles at a plurality of facilities in the business enterprise, or can occur at the manufacturer computer 112 utilizing data from many companies that use that brand of vehicles. For the latter two processes, the data from several facilities are sent to the warehouse management computer system 114 or the manufacturer computer 112 via the Internet 108 or another communication link. Thus the operating data from one vehicle can be compared to locally or globally gathered data.

Another function performed using data that is gathered by the control system 20 prevents use of an unauthorized vehicle in a restricted area. As noted above, certain warehouse environments, such as cold storage areas and areas with potentially explosive atmospheres, require special industrial vehicles that are designed to operate in those environments. For example, Type EE industrial vehicles are designed for use in areas where flammable materials are stored and a potential explosion or fire hazard exists if those materials should leak. Type EE vehicles conform to the spark proof characteristics defined in Underwriters Laboratories Standard UL 583. Further, many models of industrial vehicles cannot work satisfactorily in cold environments which adversely affect the battery power and hydraulic systems. As a consequence, special models of industrial vehicles are designed for use in cold storage areas. Many warehouses may have both special areas, such as for cold storage or for flammable material storage, as well as other areas for general purpose storage. Operators are trained that only the specially designed vehicles should be operated within such special areas.

To reinforce this training, one of the functions that can be implemented by the present industrial vehicle control system 20 is to automatically detect when an unauthorized vehicle is approaching a restricted area and provide a notification to the operator. Thereafter, if the notification is not heeded and the vehicle enters the restricted area, its operation is disabled. With reference to FIG. 2, this is accomplished by the vehicle controller 12 periodically monitoring its location as indicated by the GPS receiver 68. That GPS receiver 68 is a conventional device which utilizes the global positioning system comprising a constellation of earth orbiting satellites that continuously transmit signals containing the time in which the message was sent and ephemeris data regarding the precise orbit of the satellite. The GPS receiver 68 onboard the industrial vehicle 10 uses the signals from three or more of those satellites to determine the precise location of the vehicle. Typically, the GPS receiver determines the longitude and latitude of the industrial vehicle.

Alternatively, the location of the industrial vehicle 10 can be determined from communication with three separate wireless access points 106. Each wireless access point 106 is assigned a unique address that is included, along with the time of day, in every wireless message sent to an industrial vehicle 10. Each industrial vehicle 10 has an internal clock and is able to tell the time of day that each message in received. From the transmitted time and the received time, the propagation time of the message from the wireless access point 106 to the vehicle can be calculated. By receiving messages from at least three wireless access points 106, and by knowing the fixed location in the warehouse of each of those access points and the respective message propagation times, the vehicle location can be determined using triangulation.

Figure 10:
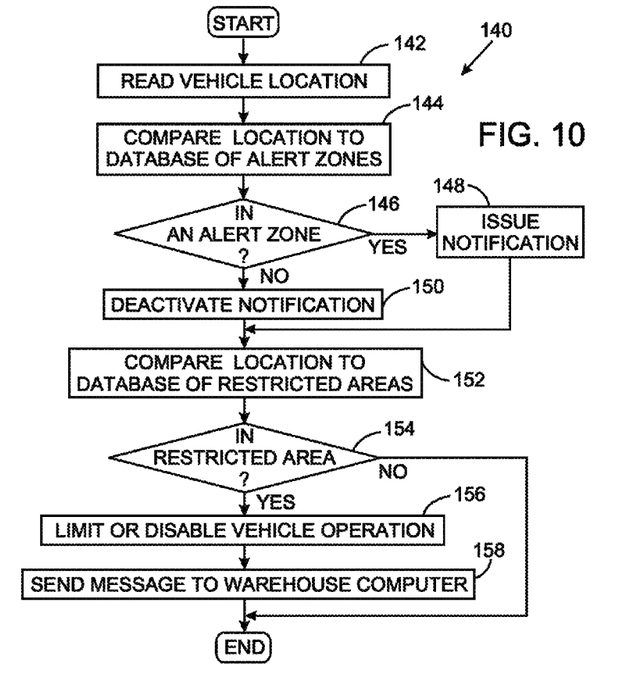
FIG. 10 is a flowchart of a software routine that is executed by the control system of the industrial vehicle to prevent operation in restricted areas.

Periodically, such as every few seconds in response to a timed interrupt, the vehicle controller 12 commences executing a location control routine 140 depicted by the flowchart in FIG. 10. That routine commences at step 142 at which the vehicle controller reads the vehicle location from the GPS receiver 68. Then at step 144, the vehicle's location is compared to a database of alert zones, or areas, defined within the warehouse for the associated class of industrial vehicles.

Figure 11:
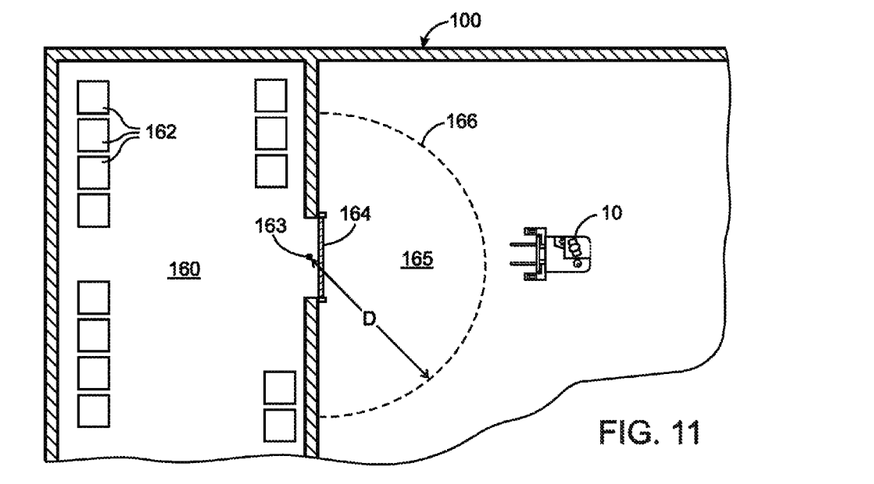
FIG. 11 is a floor plan of part of the warehouse with an area to which access is restricted to only certain types of industrial vehicles.

With additional reference to FIG. 11, the exemplary warehouse 100 has a room 160 in which flammable materials 162 are stored and which room may have an explosive environment if those materials should spill or leak from their containers. As a consequence, only industrial vehicles 10 that are rated for use in such explosive environments are permitted within room 160, which is considered to be a restricted area within the warehouse. In addition, an alert zone 165, having a boundary 166 denoted by a dashed line, is defined within the unrestricted area of the warehouse 100 in front of the door 164 into the restricted area of room 160. For example, this alert zone 165 is defined by an alert location 163 in the doorway into the restricted area of room 160, and by a distance D extending around that alert location, thereby specifying a semicircular boundary 166 of the alert zone. Although the definition of a semicircular or circular alert zone is relatively easy to implement as only two data items are required (the alert location and the distance therefrom), other boundary shapes for the alert zone can be implemented. The specification of the alert zone 165 for a particular industrial vehicle 10 is contained in a database of all such areas of the warehouse, which database is stored in the memory 24 onboard that vehicle. A similar database defining the restricted areas, such as room 160, for the particular vehicle also is provided within it onboard memory 24.

Thus at step 144, the vehicle controller 12 compares the location information from the GPS receiver 68 to the alert zones specified in its database. When the location of the industrial vehicle 10 is less than distance D from the location of the alert location 163, a determination is made at step 146 that the vehicle is within the alert zone. If so, the program execution branches to step 148 at which a notification is issued to the vehicle operator. For example, the notification is produced by an annunciator, such as the vehicle's display 55 or the audible alarm 70 (see FIG. 2). If at step 146, however, a determination is made that the industrial vehicle 10 is not within one of the defined alert zones, the process branches to step 150 at which any previous alert is deactivated.

Regardless of whether step 148 or 150 is executed, thereafter the program advances to step 152 where the present vehicle location is compared to the database within the vehicle controller memory 24 indicating the restricted areas. Then at step 154, a determination is made whether the industrial vehicle 10 has entered a restricted area. Presumably, the operator will have heeded the alert and not entered the restricted area, in which case, the program execution ends. If contrary to his or her training, the operator failed to heed the alert and continued to drive the industrial vehicle 10 into the restricted area, room 160, that event causes the location control routine 140 to branch to step 156. At this time, the vehicle controller 12 disables further operation of industrial vehicle 10. In other words, the vehicle controller deactivates the lift motor 51, the traction motor 43, and the steer motor 47. Other functions of the vehicle also are disabled. Instead of entirely disabling operation, the vehicle controller 12 could severely limit the operation, such as by limiting the speed of travel to an extremely slow maximum level or disabling only some functions. Then at step 158, the vehicle controller 12 transmits a message through the communication port 69 and the wireless communication device 71 to the warehouse communication system 102 to notify the warehouse computer system 104 that the industrial vehicle has been disabled. In this disabled condition, the vehicle cannot be operated until an authorized person enters a password into the user input device 67 and re-enables vehicle operation. Therefore, the message sent to the warehouse computer system 104 informs supervisory personnel that the industrial vehicle 10 has been disabled and gives the location of that vehicle.

In the above implementation, the databases of the alert zones and restricted areas are stored in the memory 24 onboard each industrial vehicle 10 which enables the location control routine 140 to be executed on each vehicle's controller 12. Alternatively, the databases and location control routine 140 can be stored in the warehouse computer system 104. For each alert zone or a restricted area the database indicate the particular vehicles that are allowed to operate therein. Now, each time a vehicle controller 12 reads a location from the associated GPS receiver 68, that location along with the vehicle's unique identifier are transmitted wirelessly via the communication system 102 to the warehouse computer system 104. That computer system 104 then determines, in a manner similar to that described above, whether the vehicle is within either an alert zone or a restricted area in which that vehicle should not operate. If that is true, a message is sent back to the particular industrial vehicle 10 commanding either issuance of an operator alert or disabling the vehicle operation, as is appropriate.

The vehicle control system 20 also enables the vehicle to be used in an energy conserving or "green" manner. Electrical utility companies have rate programs in which the monetary amount charged for electrical consumption varies at different times of the day. Use of electricity during peak hours, often the daylight hours, under these rate programs typically costs more than use at off-peak hours, which typically occur during the night. When the charge of the vehicle's battery 37 diminishes and needs to be recharged, the battery is removed from the vehicle and placed into a charging station. A battery, that was charged previously, is then inserted into the vehicle for continuing use, while the depleted battery is being recharged. Therefore, it is desirable to perform battery charging at off peak periods when the electrical utility rates are the lowest available. Thus it is desirable to operate the industrial vehicle in a manner which will conserve the electrical power during times at which battery replacement requires use of another battery that was charged during peak rate periods of the day. In other words, it is desirable to operate the industrial vehicle in a manner so that the battery life is prolonged until a time period when a replacement battery that has been charged during lower electrical rate periods is available.

To accomplish this, the vehicle controller 12 controls operation of the traction motor 43 so as to limit the maximum speed at which the vehicle can travel and its rate of acceleration, thereby using battery power most efficiently. In addition, the lift motor 51 that drives the pump can be operated in a similar energy conserving manner. As a consequence, even though the vehicle operator may manipulate the control actuators 41 in a manner that normally would produce rapid acceleration or a high vehicle travel speed, the vehicle controller 12 restricts that acceleration rate and the speed during periods in which the battery 37, if depleted, would have to be replaced by a battery that was charged during peak electrical rate periods. On the other hand, during off peak electrical use periods, such as at night, the limits on the vehicle's speed and acceleration are removed so that the vehicle is able to operate at the maximum speed and rate of acceleration possible.

To implement this energy conservation, the vehicle controller 12 has either a time of day clock or receives the time of day from the warehouse computer system 104 via the communication system 102. When it is desired to activate the traction motor 43, the vehicle controller queries a table of time periods of limited use that is stored in memory 24. If the current time of day is within one of those periods, the vehicle controller 12 limits the commands sent to the traction motor control 27 to regulate the vehicle acceleration and speed for energy conservation.

Another function of the onboard vehicle control system 20 facilitates the maintenance, repair and servicing of the industrial vehicle 10. As noted previously, a particular industrial vehicle may have any of numerous optional features incorporated by the manufacturer based on the order from a purchaser. When a service technician goes to the warehouse to perform maintenance or repairs on a particular industrial vehicle, that technician needs to know the "as built" configuration of that vehicle in order to know the proper maintenance procedures to perform and how to diagnose the source of a particular problem. Heretofore the "as built" information was not readily available to the service technician on the job site, unless that information was obtained from the manufacturer before being the technician was dispatched to the warehouse. In addition, the technician's service van previously had to carry an extensive library of manuals for all the different models of industrial vehicles that could possibly be serviced by the technician, as well as manuals for all the available optional features.

To facilitate such maintenance and repair work, service information regarding each specific industrial vehicle 10 is stored within the memory 24 of its vehicle controller 12 in FIG. 2. Service information includes trouble shooting manuals, repair manuals, parts manuals, operating manuals, service bulletins, bills of materials, "as built" information related to the particular vehicle, and other information related to maintaining, repairing and servicing the vehicle. This information can be initially stored by the manufacturer as part of the manufacturing process. Thereafter, as service bulletins are issued, parts numbers change, and other data becomes available, the manufacturer can transfer that data from its computer 112 in FIG. 6 through the Internet 108 to the warehouse 100 where a related vehicle is being used. Upon receipt, the warehouse computer system 104 relays that new information via the local area network 105 and the wireless access points 106 to the specific industrial vehicles 10 to which the information pertains. In addition, each time that a particular industrial vehicle 10 is serviced, a service log within its memory 24 is updated to include references to that servicing so that the log contains an entire service record.

Upon beginning work on a particular industrial vehicle 10, a technician plugs a laptop computer into the service port 72 of the control system shown in FIG. 2. In addition or as an alternative to the service port 72 for a hardwired connection, a wireless interface, such as one using the Bluetooh or WiFi communication protocol, can be provided to communicate between the industrial vehicle and the laptop computer. This enables the technician to read conventional fault codes generated by the vehicle controller 12 which indicate particular problems that the vehicle encountered, as is conventional practice. The technician then can select one of the fault codes which causes the laptop computer to send a query message to the vehicle controller 12 seeking more information related to the fault code. The vehicle controller responds by accessing the library of manuals and service bulletins to obtain information relating to the procedures to diagnose the cause of the fault code. Thus the vehicle controller 12 automatically accesses the proper materials in its library to aid the technician in servicing the industrial vehicle. Furthermore, once the problem has been diagnosed, the vehicle controller 12 also automatically accesses the respective portions of the service manuals describing the procedure for rectifying the problem and how to replace components.

In addition, the laptop computer connected via the service port 72 can access the "as built" information for the particular vehicle being serviced which greatly aids the technician understanding of the devices on the vehicle and their operation. Once the correct service procedures are identified in the manuals, the vehicle controller 12 also produces an indication of the parts that are required to effect the repair including their part numbers. Alternatively, the user input device 67 of the vehicle can be employed to access this information which then is presented to the technician via the onboard display 55. By storing such information in the vehicle's memory 24, the service technician is not required to gather detailed information about the specific vehicle to be serviced nor does the service van have to carry a complete library for servicing all the different vehicle models and configurations that are possible.

The foregoing description was primarily directed to a certain embodiments of the industrial vehicle. Although some attention was given to various alternatives, it is anticipated that one skilled in the art will likely realize additional alternatives that are now apparent from the disclosure of these embodiments. Accordingly, the scope of the coverage should be determined from the following claims and not limited by the above disclosure.

The invention claimed is:

1. A method for controlling an industrial vehicle within a building, said method comprising:
   storing, in a memory device onboard the industrial vehicle, a definition of a first area in the building;
   transmitting a separate radio signal to the industrial vehicle from at least three transmitters within the building;
   for each radio signal, determining a propagation time from the transmitter to the industrial vehicle;
   from the propagation times of the radio signals, deriving one and only one location of the industrial vehicle;
   determining, from the location and the definition of a first area, when the industrial vehicle is within the first area; and
   altering motion of the industrial vehicle in response to the industrial vehicle being within the first area.

2. The method as recited in claim 1 wherein transmitting a separate radio signal comprises transmitting signals from transceivers connected to send and receive signals through a communication network in the building.

3. The method as recited in claim 1 wherein the at least three transmitters are part of a wireless computer network system in the building.

4. The method as recited in claim 1 wherein altering motion of the industrial vehicle comprises disabling operation of the industrial vehicle.

5. The method as recited in claim 4 further comprising, in response to a command received from one of the at least three transmitters, re-enabling operation of a previously disabled industrial vehicle.

6. The method as recited in claim 4 further comprising, in response to a command received from someone other than an operator of a previously disabled industrial vehicle, re-enabling operation of a previously disabled industrial vehicle.

7. The method as recited in claim 1 wherein altering motion of the industrial vehicle comprises allowing the industrial vehicle to travel at a reduced maximum speed.

8. The method as recited in claim 1 wherein altering motion of the industrial vehicle comprises issuing an alert to an operator of the industrial. vehicle.

9. The method as recited in claim 1 wherein determining a propagation time of a radio signal comprises determining an arrival time at which the radio signal is received at the industrial vehicle; and comparing the arrival time to a transmitted time carried by the radio signal.

10. The method as recited in claim 1 wherein determining a propagation time, deriving a location of the industrial vehicle, and determining from the location when the industrial vehicle is within the first area are performed onboard the industrial vehicle.

11. The method as recited in claim 1 further comprising:
   defining a second area in the building;
   determining from the one and only one location when the industrial vehicle is within the second area; and
   altering operation of a device in response to the industrial vehicle being within the second area.

12. The method as recited in claim 11 wherein defining a second area comprises storing, in the memory device, a definition of a second area in the building.

13. The method as recited in claim 11 wherein altering operation of a device comprises disabling operation of the industrial vehicle.

14. The method as recited in claim 13 further comprising, in response to a command received from one of the at least three transmitters, re-enabling operation of a previously disabled industrial vehicle.

15. The method as recited in claim 14 wherein the command must be issued by someone other than an operator of the previously disabled industrial vehicle.

16. The method as recited in claim 11 wherein altering operation of a device comprises limiting a speed of travel of the industrial vehicle.

17. The method as recited in claim 11 wherein altering operation of a device comprises issuing an alert to an operator of the industrial vehicle.

18. The method as recited in claim 11 wherein determining a propagation time, deriving a location of the industrial vehicle, determining when the industrial vehicle is within the second area, and altering operation of a device are performed onboard the industrial vehicle.

* * * * *